US011942096B2

(12) United States Patent
Kim et al.

(10) Patent No.: US 11,942,096 B2
(45) Date of Patent: Mar. 26, 2024

(54) COMPUTER SYSTEM FOR TRANSMITTING AUDIO CONTENT TO REALIZE CUSTOMIZED BEING-THERE AND METHOD THEREOF

(71) Applicant: NAVER CORPORATION, Gyeonggi-do (KR)

(72) Inventors: Dae Hwang Kim, Seongnam-si (KR); Jung Sik Kim, Seongnam-si (KR); Dong Hwan Kim, Seongnam-si (KR); Ted Lee, Seoul (KR); Jaegyu Noh, Yongin-si (KR); Jeonghun Seo, Seoul (KR)

(73) Assignee: NAVER CORPORATION, Gyeonggi-do (KR)

( * ) Notice: Subject to any disclaimer, the term of this patent is extended or adjusted under 35 U.S.C. 154(b) by 126 days.

(21) Appl. No.: 17/534,919

(22) Filed: Nov. 24, 2021

(65) Prior Publication Data

US 2022/0392457 A1 Dec. 8, 2022
US 2023/0132374 A9 Apr. 27, 2023

(30) Foreign Application Priority Data

Nov. 24, 2020 (KR) ........................ 10-2020-0158485
Jun. 4, 2021 (KR) ........................ 10-2021-0072523

(51) Int. Cl.
*G10L 19/00* (2013.01)

(52) U.S. Cl.
CPC .................................... *G10L 19/00* (2013.01)

(58) Field of Classification Search
CPC ....................................................... G10L 19/00
(Continued)

(56) References Cited

U.S. PATENT DOCUMENTS 9,654,895 B2 * 5/2017 Breebaart ............... H04S 7/308
2014/0133683 A1 5/2014 Robinson et al.
(Continued)

FOREIGN PATENT DOCUMENTS

JP A 04-15693 A 1/1992
JP 2005-150993 A 6/2005
(Continued)

OTHER PUBLICATIONS

S. Higs6nmez, H. T. Sencar and I. Avcibas, "Audio codec identification through payload sampling," 2011 IEEE International Workshop on Information Forensics and Security, Iguacu Falls, Brazil, 2011, pp. 1-6, doi: 10.1109/WIFS.2011 (Year: 2011).*
(Continued)

*Primary Examiner* — Bharatkumar S Shah
(74) *Attorney, Agent, or Firm* — Harness, Dickey & Pierce, P.L.C.

(57) ABSTRACT

Provided are a computer system for transmitting audio content to realize a user-customized being-there and a method thereof. The computer system may be configured to detect audio files that are generated for a plurality of objects at a venue, respectively, and metadata including spatial features that are set for the objects at the venue, respectively, and to transmit the audio files and the metadata for a user. An electronic device of the user may realize a being-there at the venue by rendering the audio files based on the spatial features in the metadata. That is, the user may feel a user-customized being-there as if the user directly listens to audio signals generated from corresponding objects at a venue in which the objects are provided.

16 Claims, 11 Drawing Sheets

(58) Field of Classification Search
USPC .......................................................... 704/500
See application file for complete search history.

(56) References Cited

U.S. PATENT DOCUMENTS

| | | | | |
|---|---|---|---|---|
| 2016/0142846 | A1 | 5/2016 | Herre et al. | |
| 2016/0192105 | A1* | 6/2016 | Breebaart | G10L 19/018 381/303 |
| 2020/0053457 | A1 | 2/2020 | Vilkamo | |
| 2020/0275230 | A1 | 8/2020 | Laaksonen et al. | |
| 2021/0029480 | A1 | 1/2021 | Mate et al. | |
| 2022/0116726 | A1 | 4/2022 | Alur | |
| 2022/0392457 | A1 | 12/2022 | Kim et al. | |

FOREIGN PATENT DOCUMENTS

| | | | | |
|---|---|---|---|---|
| JP | 2014-526168 | A | 10/2014 | |
| JP | 2019-535216 | A | 12/2019 | |
| JP | 2022-83443 | A | 6/2022 | |
| JP | 2022-83445 | A | 6/2022 | |
| KR | 10-2012-0062758 | A | 6/2012 | |
| KR | 101717928 | B1 * | 1/2015 | G10L 19/16 |
| KR | 10-2019-0123300 | A | 10/2019 | |
| KR | 10-2019-0134854 | A | 12/2019 | |
| KR | 10-2020-0040745 | A | 4/2020 | |
| WO | WO-2015/182492 | A1 | 12/2015 | |
| WO | WO-2019/069710 | A1 | 4/2019 | |
| WO | WO-2020/010064 | A1 | 1/2020 | |

OTHER PUBLICATIONS

Korean Office Action dated Jun. 29, 2022 issued in corresponding Korean Patent Application No. 10-2021-0072523.
Japanese Office Action dated Dec. 6, 2022 issued in Japanese Patent Application No. 2021-190471.
Korean Office Action dated Jun. 29, 2022 issued in corresponding Korean Patent Application No. 10-2021-007252.
Japanese Office Action dated Dec. 6, 2022 issued in Japanese Patent Application No. 2021-190470.
Japanese Office Action dated Jun. 27, 2023 issued in Japanese Patent Application No. 2021-190470.
Korean Office Action dated Jul. 19, 2022 issued in Korean Patent Application No. 10-2021-0072524.
Japanese Office Action dated Dec. 6, 2022 issued in Japanese Patent Application No. 2021-190472.
Japanese Office Action dated Jun. 27, 2023 issued in corresponding Japanese Patent Application No. 2021-190472.
U.S. Office Action dated Jun. 15, 2023 issued in co-pending U.S. Appl. No. 17/534,823.
Gunnarsson, "Creating the Perfect Sound System with 3D Sound Reproduction", Jun. 27, 2017 (Year: 2017).
U.S. Office Action dated May 3, 2023 issued in co-pending U.S. Appl. No. 17/534,804.
U.S. Office Action dated Jun. 13, 2023 issued in co-pending U.S. Appl. No. 17/534,804.
U.S. Notice of Allowance dated Aug. 30, 2023 issued in co-pending U.S. Appl. No. 17/534,804.
U.S. Notice of Allowance dated Oct. 4, 2023 issued in co-pending U.S. Appl. No. 17/534,823.

* cited by examiner

FIG. 5A

| Syntax | No. of bits | Mnemonic |
| --- | --- | --- |
| raw_data_block() | | |
| { | | |
| While((id = id_syn_ele) != ID_END ){ | 3 | uimsbf |
| switch (id) { | | |
| case ID_SCE: single_channel_element(); | | |
| break; | | |
| case ID_CPE: channel_pair_element(); | | |
| break; | | |
| case ID_CCE: coupling_channel_element(); | | |
| break; | | |
| case ID_LFE: lfe_channel_element(); | | |
| break; | | |
| case ID_DSE: data_stream_element(); | | |
| break; | | |
| case ID_PCE: program_config_element(); | | |
| break; | | |
| case ID_FIL: fill_element(); | | |
| } | | |
| } | | |
| byte_alignment(); | | |
| } | | |

FIG. 5B

Mono
<SCE> <TERM> <SCE> <TERM> ···

Stereo
<CPE> <TERM> <CPE> <TERM>

5.1 channel Signal
<SCE> <CPE> <CPE> <LFE> <TERM>
<SCE> <CPE> <CPE> <LFE> <TERM> ···

Multi channel Signal (Meta Injected)
<CPE> <CPE> ···<DSE> <TERM>
<CPE> <CPE> ···<DSE> <TERM> ···

COMPUTER SYSTEM FOR TRANSMITTING AUDIO CONTENT TO REALIZE CUSTOMIZED BEING-THERE AND METHOD THEREOF

CROSS-REFERENCE TO RELATED APPLICATION(S)

This U.S. non-provisional application and claims the benefit of priority under 35 U.S.C. § 119 to Korean Patent Application Nos. 10-2020-0158485 filed on Nov. 24, 2020, and 10-2021-0072523 filed on Jun. 4, 2021, the entire contents of each of which are incorporated herein by reference in their entirety.

BACKGROUND

Technical Field

One or more example embodiments relate to computer systems for transmitting audio content to realize a user-customized being-there and/or methods thereof.

Related Art

In general, a content providing server provides audio content in a completed form for a user. Here, the audio content in the completed form, that is, the completed audio content is implemented by mixing a plurality of audio signals, and, for example, represents stereo audio content. Through this, an electronic device of a user receives the completed audio content and simply plays back the received audio content. That is, the user only listens to sound of a predetermined configuration based on the completed audio content.

SUMMARY

Some example embodiments provide stereophonic sound implementation technologies for realizing a being-there in association with audio.

Some example embodiments provide computer systems for transmitting audio content to realize a user-customized being-there and/or methods thereof.

According to an aspect of at least one example embodiment, a method by a computer system includes detecting audio files and metadata, the audio files being generated for a plurality of objects at a venue, respectively, the metadata including spatial features at the venue that are set for the objects, respectively, and transmitting the audio files and the metadata for a user.

According to an aspect of at least one example embodiment, there is provided a non-transitory computer-readable record medium storing a program, which when executed by at least one processor included in a computer system, to cause the computer system to perform the aforementioned method.

According to an aspect of at least one example embodiment, a computer system includes a memory and a processor configured to connect to each of the memory and execute at least one instruction stored in the memory. The processor is configured to cause the computer system to detect audio files and metadata, the audio files being generated for a plurality of objects at a venue, respectively, the metadata including spatial features at the venue that are set for the objects, respectively, and transmit the audio files and the metadata for a user.

According to example embodiments, it is possible to propose a transmission scheme for audio files and metadata as materials for realizing a user-customized being-there. That is, a new transmission format having an immersive audio track is proposed and a computer system may transmit the audio files and the metadata to an electronic device of a user through the immersive audio track. Through this, the electronic device may reproduce user-customized audio content instead of simply playing back completed audio content. That is, the electronic device may implement stereophonic sound by rendering the audio files based on the spatial features in the metadata. Therefore, the electronic device may realize the user-customized being-there in association with audio and the user may feel the user-customized being-there, as if the user directly listens to audio signals generated from specific objects at a specific venue.

Further areas of applicability will become apparent from the description provided herein. The description and specific examples in this summary are intended for purposes of illustration only and are not intended to limit the scope of the present disclosure.

BRIEF DESCRIPTION OF DRAWINGS

FIGS. 3, 4, 5A, and 5B illustrate examples of a transmission format of a computer system according to at least one example embodiment;

DETAILED DESCRIPTION

Figure 1:
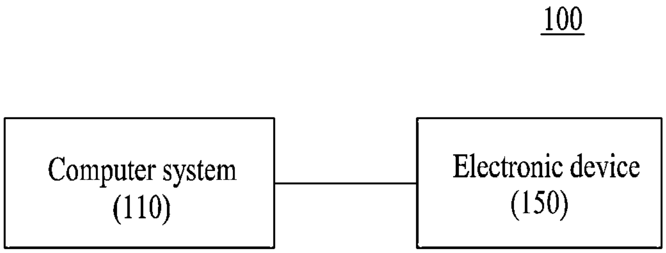
FIG. 1 is a diagram illustrating an example of a content providing system according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

In the following, the term "object" may represent a device or a person that generates an audio signal. For example, the object may include one of a musical instrument, an instrument player, a vocalist, a talker, a speaker that generates accompaniment or sound effect, and a background that generates ambience. The term "audio file" may represent audio data for an audio signal generated from each object.

In the following, the term "metadata" may represent information for describing a property of at least one audio file. Here, the metadata may include at least one spatial feature of at least one object. For example, the metadata may include at least one of position information about at least one object, group information representing a position combination of at least two objects, and environment information about a venue in which at least one object may be disposed. The venue may include, for example, a studio, a concert hall, a street, and a stadium.

Figure 2:
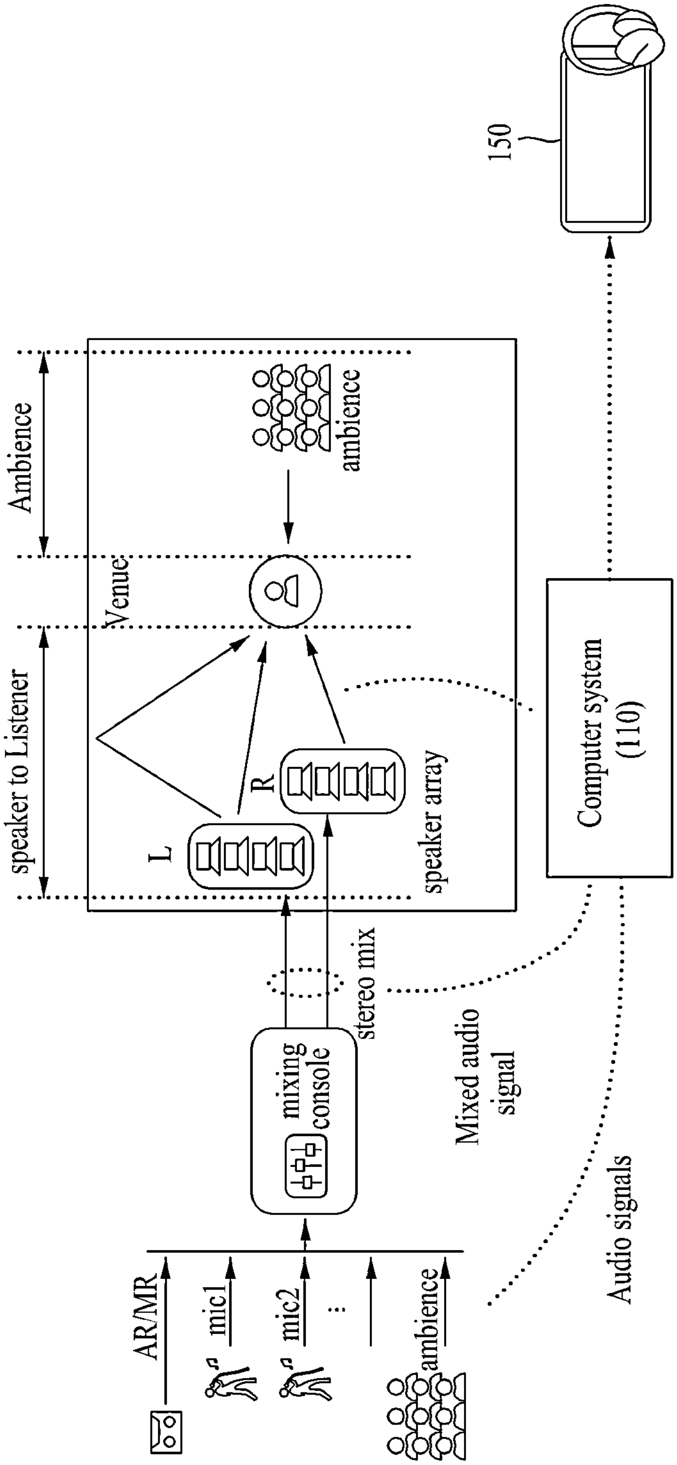
FIG. 2 illustrates an example of describing a function of a content providing system according to at least one example embodiment.

FIG. 1 is a diagram illustrating a content providing system 100 according to at least one example embodiment, and FIG. 2 illustrates an example of describing a function of the content providing system 100 according to at least one example embodiment. FIGS. 3, 4, 5A, and 5B illustrate examples of describing a transmission format 300 of a computer system 110 according to at least one example embodiment.

Referring to FIG. 1, the content providing system 100 may include a computer system 110 and an electronic device 150. For example, the computer system 110 may include at least one server. For example, the electronic device 150 may include at least one of a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a home appliance, a medical device, and a robot.

The computer system 110 may provide content for a user. Here, the computer system 110 may be a live streaming server. Here, the content may refer to various types of contents, for example, audio content, video content, virtual reality (VR) content, augmented reality (AR) content, and extended reality (XR) content. The content may include at least one of plain content and immersive content. The plain content may refer to completed content and the immersive content may refer to user-customized content. Hereinafter, description is made using the audio content as an example.

Plain audio content may be implemented in a stereo form by mixing audio signals generated from a plurality of objects. For example, referring to FIG. 2, the computer system 110 may obtain an audio signal in which audio signals of a venue are mixed and may generate the plain audio content based on the audio signal. Meanwhile, immersive audio content may include audio files for the audio signals generated from the plurality of objects at the venue and metadata related thereto. Here, in the immersive audio content, the audio files and the metadata related thereto may be individually present. For example, referring to FIG. 2, the computer system 110 may obtain audio files for a plurality of objects, respectively, and may generate the immersive audio content based on the audio files.

The electronic device 150 may play back content provided from the computer system 110. Here, the content may refer to various types of contents, for example, audio content, video content, VR content, AR content, and XR content. The content may include at least one of plain content and immersive content.

When the immersive audio content is received from the computer system 110, the electronic device 150 may obtain audio files and metadata related thereto from the immersive audio content. The electronic device 150 may render the audio files based on the metadata. Through this, the electronic device 150 may realize a user-customized being-there in association with audio based on the immersive audio content. Therefore, the user may feel being-there as if the user directly listens to an audio signal generated from a corresponding object at a venue in which at least one object is disposed.

Figure 3:
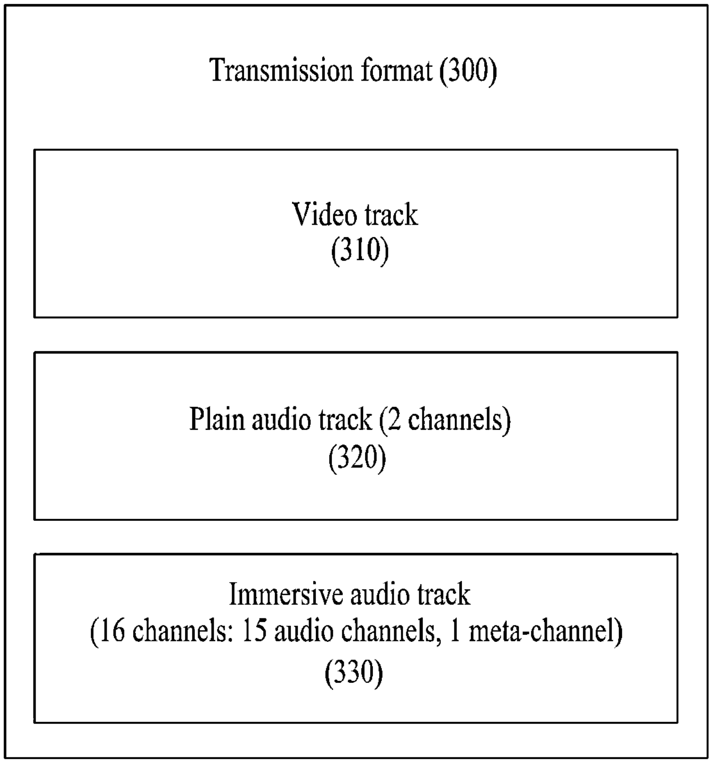

According to example embodiments, the computer system 110 may support a desired (or alternatively, predetermined) transmission format 300. Referring to FIG. 3, the transmission format 300 refers to a multi-track, and may include a video track 310 for video content, a plain audio track 320 for plain audio content, and an immersive audio track 330 for immersive audio content. Here, the plain audio track 320 may include two channels and the immersive audio track 330 may include a plurality of audio channels and a single meta-channel. That is, the computer system 110 may receive or transmit the immersive audio content through the immersive audio track 330.

Figure 4:
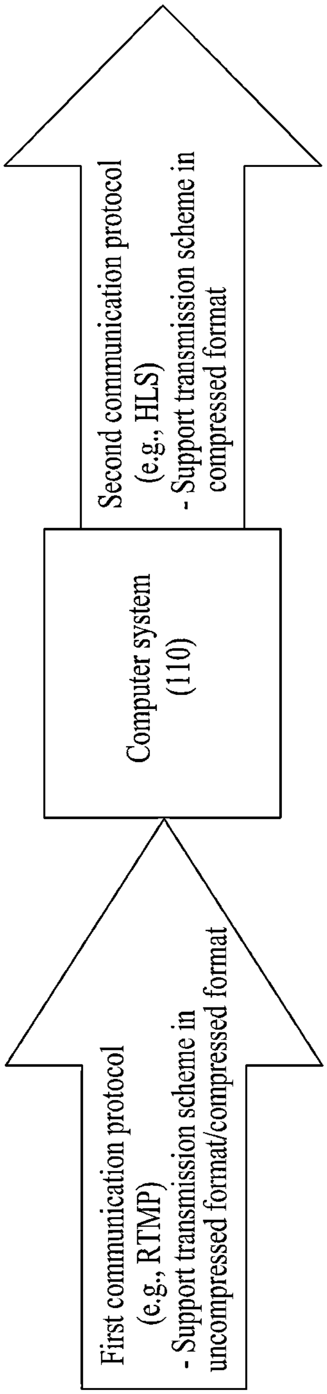

Referring to FIG. 4, the computer system 110 may receive audio files and metadata from an external electronic device (also, referred to as a production studio) based on a first communication protocol. For example, the first communication protocol may be a real-time messaging protocol (RTMP). Here, the first communication protocol may support a transmission scheme in an uncompressed format. That is, the computer system 110 may receive the audio files and the metadata using the transmission scheme in the uncompressed format. Here, the metadata may be converted to the same format as the audio files and transmitted with the audio files. For example, content embedded with the audio files and the metadata may be transmitted and the computer system 110 may obtain the audio files and the metadata through de-embedding of the received content. In some example embodiments, the first communication protocol may support a transmission scheme in a compressed format. For example, the compressed format may include an advanced audio coding (AAC) standard.

The received immersive audio track 330 may include a multi-channel pulse code modulation (PCM) audio signal. The multi-channel PCM audio signal may include a plurality of audio channels including a plurality of audio signals, and a single meta-channel including metadata. Depending on cases, a last channel of a multi-channel may be used as the meta-channel. A plurality of audio signals of a corresponding multi-channel may be time-synchronized between channels. Therefore, time synchronization between each audio channel and the meta-channel may be guaranteed.

The received immersive audio track 330 may be encoded using an audio codec and thereby transmitted. Here, the metadata may be inserted into the encoded immersive audio content. Therefore, the multi-channel may be processed to fit a frame size of the audio codec and may be inserted into the immersive audio track 330. The meta-channel of the received immersive audio track 330 may include metadata of a plurality of sets for a single frame. When encoding and transmitting the immersive audio track 330, the immersive audio track 330 may be transmitted by selecting a single set from among the plurality of sets and by inserting the selected set.

Referring to FIG. 4, the computer system 110 may transmit audio files and metadata to the electronic device 150 based on a second communication protocol. For example, the second communication protocol may be an HTTP live streaming (HLS). Here, the second communication protocol may support a transmission scheme in a compressed format. For example, the compressed format may include an advanced audio coding (AAC) standard. In this case, the audio files and the metadata may be transmitted using an AAC standard of an MPEG container as illustrated in FIG. 5A. Here, according to the AAC standard, multi-channels each including a data stream element (DSE) may be used as illustrated in FIG. 5B. For example, the computer system 110 may inject metadata into a DSE in the AAC standard and may encode audio files and metadata in a bitstream format based on the AAC standard. In the case of using a loss-compression codec to encode an audio signal, the metadata may be degraded. To mitigate or prevent this, the corresponding metadata may be inserted without going through a separate encoding process. For example, in the case of using an AAC audio stream, metadata may be inserted into a DSE and thereby transmitted. In a process of inserting the metadata, a suitability inspection of the metadata may be implemented. For example, in a process of inserting each piece of metadata, the metadata may be verified to be correct and thereby inserted by verifying a start flag and an end flag of the metadata. Here, unless each flag is verified in a flag verification process, stability may be guaranteed by inserting metadata of a previous frame into a corresponding frame and a notification that incorrect metadata is inserted into the corresponding frame may be transmitted to a user of a transmission program. Through this, the computer system 110 may transmit the encoded audio files and metadata to the electronic device 150.

An electronic device may generate audio files and metadata for a plurality of objects, and may provide the audio files and the metadata to the computer system 110. For example, the electronic device may include at least one of a smartphone, a mobile phone, a navigation device, a computer, a laptop computer, a digital broadcasting terminal, a PDA, a PMP, a tablet PC, a game console, a wearable device, an IoT device, a home appliance, a medical device, and a robot. According to an example embodiment, the electronic device may be present outside the computer system 110 and may transmit audio files and metadata to the computer system 110. Here, the electronic device may transmit the audio files and the metadata based on a first communication protocol. For example, the first communication protocol may be an RTMP. According to another example embodiment, the electronic device may be integrated in the computer system 110.

For example, the electronic device may generate audio files for a plurality of objects and metadata related thereto. For example, the electronic device may obtain audio signals generated from objects at a specific venue, respectively. Here, the electronic device may obtain each audio signal through a microphone directly attached to each object or installed to be adjacent to each object. The electronic device may generate the audio files using the audio signals, respectively. Further, the electronic device may generate the metadata related to the audio files. For example, the electronic device may set spatial features at a venue for objects, respectively. For example, the electronic device may set the spatial features of the objects based on an input of a creator through a graphic interface. Here, the electronic device may detect at least one of position information about each object and group information representing a position combination of at least two objects using a direct position of each object or a position of a microphone for each object. Further, the electronic device may detect environment information about a venue in which objects are disposed. The electronic device may generate the metadata based on the spatial features of the objects.

Figure 6:
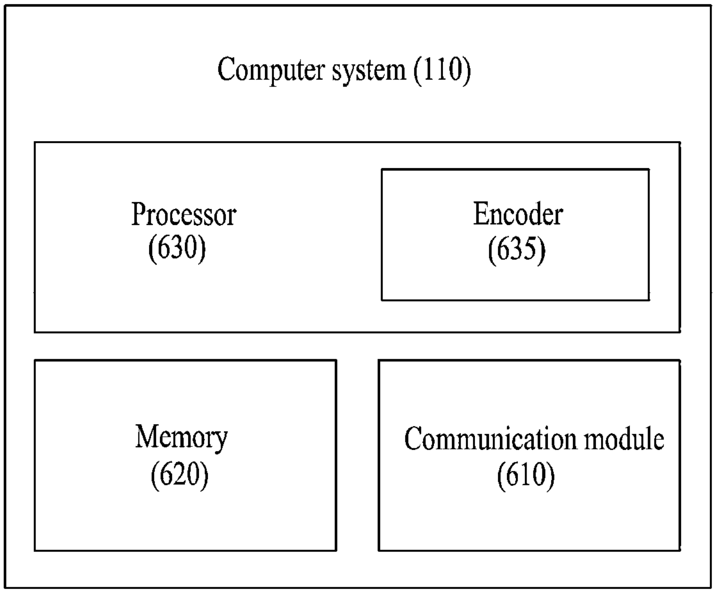
FIG. 6 is a diagram illustrating an example of an internal configuration of a computer system according to at least one example embodiment.

FIG. 6 is a diagram illustrating an example of an internal configuration of the computer system 110 according to at least one example embodiment. In some example embodiments, the computer system 110 may be a live streaming server for the electronic device 150.

Referring to FIG. 6, the computer system 110 may include at least one of a communication module 610, a memory 620, and a processor 630. In some example embodiments, at least one of components of the computer system 110 may be omitted and at least one another component may be added. In some example embodiments, at least two components among components of the computer system 110 may be implemented as single integrated circuitry.

The communication module 610 may communicate with an external device in the computer system 110. The communication module 610 may establish a communication channel between the computer system 110 and the external device and communicate with the external device through the communication channel. For example, the external device may include at least one of an external electronic device and the electronic device 150. The communication module 610 may include at least one of a wired communication module and a wireless communication module. The wired communication module may be connected to the external device in a wired manner and may communicate with the external device in the wired manner. The wireless communication module may include at least one of a near field communication module and a far field communication module. The near field communication module may communicate with the external device using a near field communication scheme. For example, the near field communication scheme may include at least one of Bluetooth, wireless fidelity (WiFi) direct, and infrared data association (IrDA). The far field communication module may communicate with the external device using a far field communication scheme. Here, the far field communication module may communicate with the external device over a network. For example, the network may include at least one of a cellular network, the Internet, and a computer network such as a local area network (LAN) and a wide area network (WAN).

The communication module 610 may support the desired (or alternatively, predetermined) transmission format 300. Referring to FIG. 3, the transmission format 300 refers to a multi-track, and may include the video track 310 for video content, the plain audio track 320 for plain audio content, and the immersive audio track 330 for immersive audio content. Here, the plain audio track 320 may include two channels and the immersive audio track 330 may include a plurality of channels. Here, the channels may include a plurality of audio channels and a single meta-channel.

The memory 620 may store a variety of data used by at least one component of the computer system 110. For example, the memory 620 may include at least one of a volatile memory and a non-volatile memory. Data may include at least one program and input data or output data related thereto. The program may be stored in the memory 620 as software including at least one instruction.

The processor 630 may control at least one component of the computer system 110 by executing the program of the memory 620. Through this, the processor 630 may perform data processing or operation. Here, the processor 630 may execute an instruction stored in the memory 620. The processor 630 may provide content for the user. Here, the processor 630 may transmit the content to the electronic device 150 of the user through the communication module 610. The content may include at least one of video content, plain audio content, and immersive audio content. The processor 630 may transmit the content based on the transmission format 300 of FIG. 3. According to an example embodiment, the processor 630 may receive the content from the external electronic device (also, referred to as a production studio) and may transmit the content to the electronic device 150.

The processor 630 may detect audio files that are generated for a plurality of objects at a specific venue and metadata related thereto. Here, the metadata may include spatial features at the venue that are set for the objects, respectively. According to an example embodiment, the processor 630 may detect audio files and metadata by receiving the audio files and the metadata from the external electronic device as the immersive audio track 330 through the communication module 610. Here, the processor 630 may receive the audio files and the metadata based on a first communication protocol. For example, the first communication protocol may be an RTMP.

The processor 630 may transmit the audio files and the metadata for the user. The processor 630 may transmit the audio files and the metadata to the electronic device 150 as the immersive audio track 330 through the communication module 610. Here, the processor 630 may transmit the audio files and the metadata based on a second communication protocol. For example, the second communication protocol may be an HTTP live streaming (HLS). The processor 630 may include an encoder 635. The encoder 635 may encode each of the audio files and the metadata for the immersive audio track 330. According to some example embodiments, the communication module 610 may be implemented as part of the processor 630. Thus, the processor 630 and the communication module 610 may be provided as single integrated circuitry.

Figure 7:
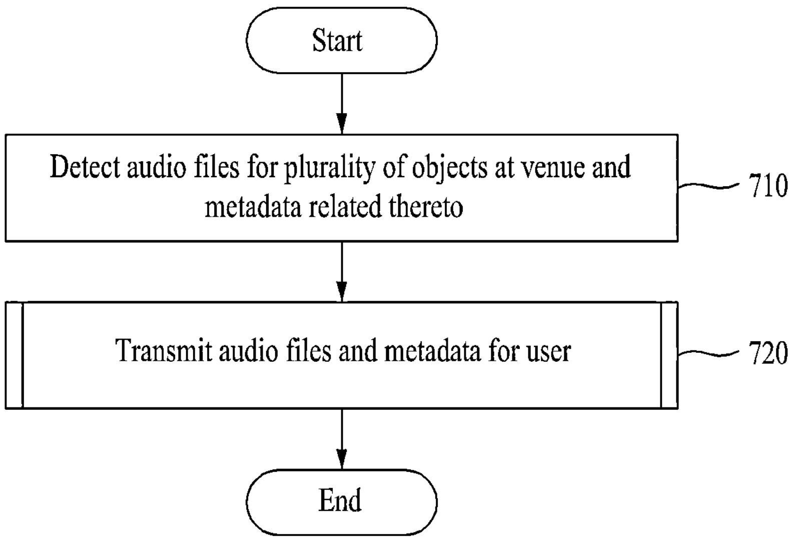
FIG. 7 is a flowchart illustrating an example of an operation procedure of a computer system according to at least one example embodiment.

FIG. 7 is a flowchart illustrating an example of an operation procedure of the computer system 110 according to at least one example embodiment.

Referring to FIG. 7, in operation 710, the computer system 110 may detect audio files for a plurality of objects at a specific venue and metadata related thereto. Here, the metadata may include spatial features at the venue that are set for the objects, respectively. According to an example embodiment, the processor 630 may detect the audio files and the metadata by receiving the audio files and the metadata from an external electronic device as the immersive audio track 330 through the communication module 610. Here, referring to FIG. 4, the processor 630 may receive the audio files and the metadata based on a first communication protocol. For example, the first communication protocol may be an RTMP. Here, the first communication protocol may support a transmission scheme in an uncompressed format. That is, the computer system 110 may receive the audio files and the metadata using the transmission scheme in the uncompressed format. Here, the metadata may be converted to the same format as the audio files and thereby transmitted with the audio files. For example, content embedded with the audio files and the metadata may be transmitted and the computer system 110 may obtain the audio files and the metadata through de-embedding of the received content. In some example embodiments, the first communication protocol may support a transmission scheme in a compressed format. For example, the compressed format may include an AAC standard.

In operation 720, the computer system 110 may transmit the audio files and the metadata for a user. The processor 630 may transmit the audio files and the metadata to the electronic device 150 as the immersive audio track 330, through the communication module 610. Here, the processor 630 may transmit the audio files and the metadata based on a second communication protocol. For example, the second communication protocol may be an HTTP live streaming (HLS). Here, the second communication protocol may support a transmission scheme in a compressed format. For example, the compressed format may include an AAC standard. In this case, the audio files and the metadata may be transmitted using an AAC standard of an MPEG container as illustrated in FIG. 5A. Here, according to the AAC standard, multi-channels each including a DSE may be used as illustrated in FIG. 5B. Further description related thereto is made with reference to FIG. 8.

Figure 8:
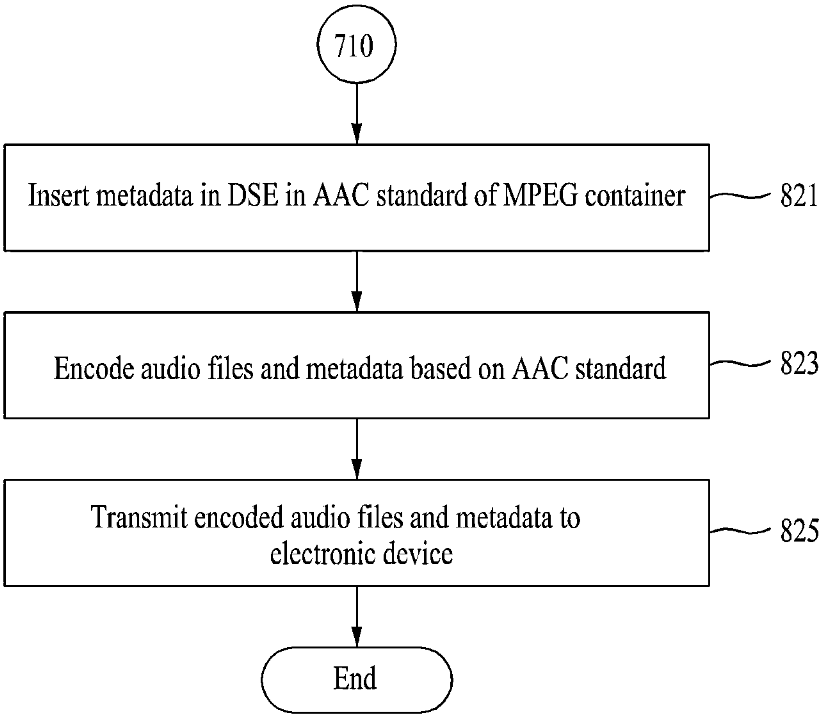
FIG. 8 is a flowchart illustrating a detailed procedure of transmitting audio files and metadata of FIG. 7.

FIG. 8 is a flowchart illustrating a detailed procedure of transmitting the audio files and the metadata (operation 720) of FIG. 7.

Referring to FIG. 8, in operation 821, the computer system 110 may inject the metadata into the AAC standard of the MPEG container. Here, the processor 630 may inject the metadata into the DSE in the AAC standard. In operation 823, the computer system 110 may encode the audio files and the metadata based on the AAC standard. Here, the processor 630 may encode the audio files and the metadata in a bitstream format. Through this, in operation 825, the computer system 110 may transmit the encoded audio files and metadata to the electronic device 150. Here, the processor 630 may transmit the encoded audio files and metadata to the electronic device 150 through the communication module 610.

Figure 9:
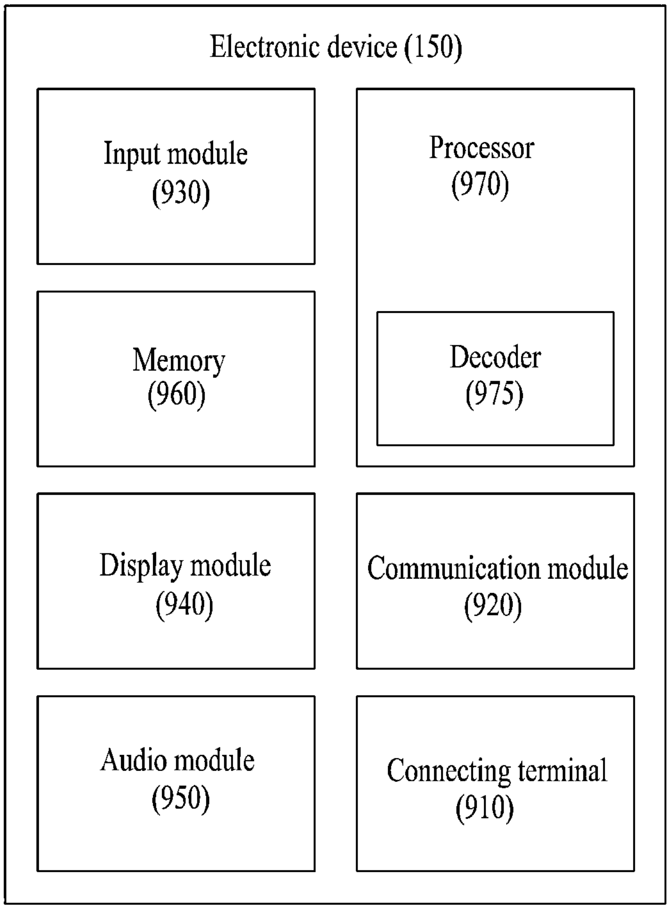
FIG. 9 is a diagram illustrating an example of an internal configuration of an electronic device according to at least one example embodiment.

FIG. 9 is a diagram illustrating an example of an internal configuration of the electronic device 150 according to at least one example embodiment.

Referring to FIG. 9, the electronic device 150 may include at least one of a connecting terminal 910, a communication module 920, an input module 930, a display module 940, an audio module 950, a memory 960, and a processor 970. In some example embodiments, at least one of components of the electronic device 150 may be omitted and at least one another component may be added. In some example embodiments, at least two components among components of the electronic device 150 may be implemented as a single integrated circuitry.

The connecting terminal 910 may be physically connected to an external device in the electronic device 150. For example, the external device may include another electronic device. To this end, the connecting terminal 910 may include at least one connector. For example, the connector may include at least one of a high-definition multimedia interface (HDMI) connector, a universal serial bus (USB) connector, a secure digital (SD) card connector, and an audio connector.

The communication module 920 may communicate with the external device in the electronic device 150. The communication module 920 may establish a communication channel between the electronic device 150 and the external device and may communicate with the external device through the communication channel. For example, the external device may include the computer system 110. The communication module 920 may include at least one of a wired communication module and a wireless communication module. The wired communication module may be connected to the external device in a wired manner through the connecting terminal 910 and may communicate with the external device in the wired manner. The wireless communication module may include at least one of a near field communication module and a far field communication module. The near field communication module may communicate with the external device using a near field communication scheme. For example, the near field communication scheme may include at least one of Bluetooth, WiFi direct, and IrDA. The far field communication module may communicate with the external device using a far field communication scheme. Here, the far field communication module may communicate with the external device through a network. For example, the network may include at least one of a cellular network, the Internet, and a computer network such as a LAN and a WAN.

The input module 930 may input a signal to be used for at least one component of the electronic device 150. The input module 930 may include at least one of an input device configured for the user to directly input a signal to the electronic device 150, a sensor device configured to detect an ambient environment and to generate a signal, and a camera module configured to capture an image and to generate image data. For example, the input device may include at least one of a microphone, a mouse, and a keyboard. In some example embodiments, the sensor device may include at least one of a head tracking sensor, a head-mounted display (HMD) controller, a touch circuitry configured to detect a touch, and a sensor circuitry configured to measure strength of force occurring due to the touch.

The display module 940 may visually display information. For example, the display module 940 may include at least one of a display, an HMD, a hologram device, and a projector. For example, the display module 940 may be configured as a touchscreen through assembly to at least one of the sensor circuitry and the touch circuitry of the input module 930.

The audio module 950 may auditorily play back information. For example, the audio module 950 may include at least one of a speaker, a receiver, an earphone, and a headphone.

The memory 960 may store a variety of data used by at least one component of the electronic device 150. For example, the memory 960 may include at least one of a volatile memory and a non-volatile memory. Data may include at least one program and input data or output data related thereto. The program may be stored in the memory 960 as software including at least one instruction and, for example, may include at least one of an operating system (OS), middleware, and an application.

The processor 970 may control at least one component of the electronic device 150 by executing the program of the memory 960. Through this, the processor 970 may perform data processing or operation. Here, the processor 970 may execute an instruction stored in the memory 960. The processor 970 may play back content provided from the computer system 110. The processor 970 may play back video content through the display module 940 or may play back at least one of plain audio content and immersive audio content through the audio module 950.

The processor 970 may receive audio files and metadata for objects at a specific venue from the computer system 110 through the communication module 920. The processor 970 may include a decoder 975. The decoder 975 may decode the received audio files and metadata. Here, the decoder 975 may decode the audio files and the metadata for the immersive audio track 330. The processor 970 may render the audio files based on the metadata. Through this, the processor 970 may render the audio files based on spatial features of the objects in the metadata.

Figure 10:
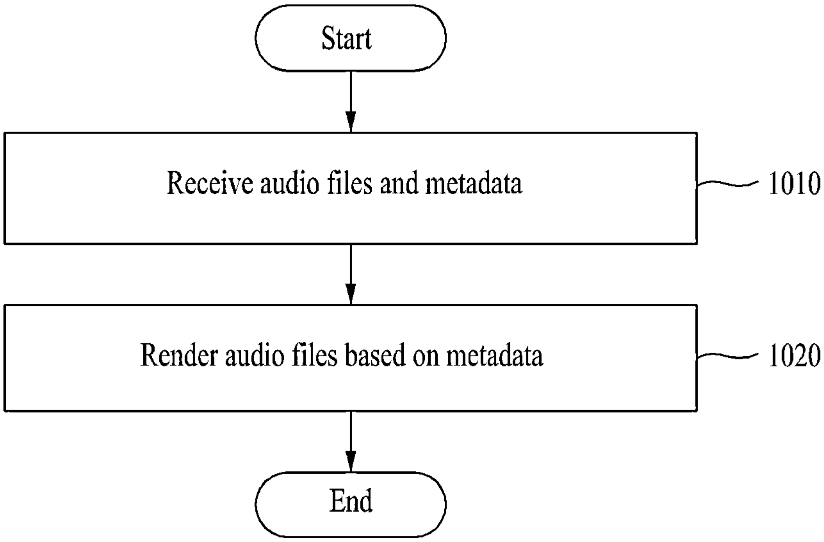
FIG. 10 is a flowchart illustrating an example of an operation procedure of an electronic device according to at least one example embodiment.

FIG. 10 is a flowchart illustrating an example of an operation procedure of the electronic device 150 according to at least one example embodiment.

Referring to FIG. 10, in operation 1010, the electronic device 150 may receive audio files and metadata. The processor 970 may receive audio files and metadata for objects at a specific venue from the server 330 through the communication module 920. Here, the processor 970 may receive the audio files and the metadata using a second communication protocol, for example, an HLS. Although not illustrated, the processor 970 may decode the audio files and the metadata. Here, the processor 970 may decode the audio files and the metadata based on an AAC standard.

In operation 1020, the electronic device 150 may select at least one object from among the objects based on the metadata. Here, the processor 970 may select at least one object from among the objects based on an input of a user through a user interface. For example, the processor 970 may output the user interface for the user. For example, the processor 970 may output the user interface to an external device through the communication module 920. As another example, the processor 970 may output the user interface through the display module 940. The processor 970 may select at least one object from among the objects based on an input of at least one user through the user interface.

In operation 1020, the electronic device 150 may render the audio files based on the metadata. The processor 970 may render the audio files based on spatial features of the objects in the metadata. The processor 970 may play back final audio signals through the audio module 950 by applying the spatial features of the selected objects to the audio files of the objects. Through this, the electronic device 150 may realize a user-customized being-there for a corresponding venue.

Accordingly, the user of the electronic device 150 may feel the user-customized being-there as if the user directly listens to audio signals generated from corresponding objects at a venue in which the objects are disposed.

According to some example embodiments, it is possible to propose a transmission scheme for audio files and metadata as materials for realizing a user-customized being-there. That is, a new transmission format, for example, the transmission format 300 having the immersive audio track 330 is proposed and the computer system 110 may transmit the audio files and the metadata to the electronic device 150 of the user through the immersive audio track 330. Through this, the electronic device 150 of the user may reproduce user-customized audio content instead of simply playing back completed audio content. That is, the electronic device 150 may implement stereophonic sound by rendering the audio files based on the spatial features in the metadata. Therefore, the electronic device 150 may realize the user-customized being-there in association with audio by using the audio files and the metadata as materials and the user of the electronic device 150 may feel the user-customized being-there, as if the user directly listens to audio signals generated from specific objects at a specific venue.

A method by the computer system 110 according to some example embodiments may include detecting audio files that are generated for a plurality of objects, respectively, at a venue and metadata including spatial features at the venue that are set for the objects (operation 710), respectively, and transmitting the audio files and the metadata for a user (operation 720).

According to some example embodiments, the computer system 110 may support the transmission format 300 including the video track 310 for video content, the plain audio track 320 for completed audio content, and the immersive audio track 330 for the audio files and the metadata.

According to some example embodiments, the metadata may include at least one of position information about each of the objects, group information representing a position combination of at least two objects among the objects, and environment information about the venue.

According to some example embodiments, each of the objects may include one of a musical instrument, an instrument player, a vocalist, a talker, a speaker, and a background.

According to some example embodiments, the immersive audio track 330 may include a plurality of audio channels for the audio files and a single meta-channel for the metadata.

According to some example embodiments, the immersive audio track 330 may include a PCM audio signal and may be encoded by an audio codec.

According to some example embodiments, the metadata may be transmitted through a single channel of the PCM audio signal, synchronized with the audio files, and transmitted according to a transmission period that is determined based on a frame size of the audio codec.

According to some example embodiments, a plurality of sets may be written in a single frame, and when the metadata is encoded using an AAC standard, at least one set among the plurality of sets may be inserted into a DSE, and when a start flag or an end flag of the metadata is not verified, metadata of a previous frame may be inserted.

According to some example embodiments, the detecting of the audio files and the metadata (operation 710) may include receiving the audio files and the metadata from an electronic device based on a first communication protocol, through the immersive audio track of the format.

According to some example embodiments, the transmitting of the audio files and the metadata (operation 720) may include transmitting the audio files and the metadata to an electronic device of the user based on a second communication protocol, through the immersive audio track of the format.

According to some example embodiments, the first communication protocol may support a transmission scheme in an uncompressed format or a compressed format.

According to some example embodiments, the second communication protocol may support a transmission scheme in a compressed format.

According to some example embodiments, the electronic device 150 may be configured to realize a being-there at the venue by receiving the audio files and the metadata through the immersive audio track 330, by decoding the audio files and the metadata, and by rendering the audio files based on the spatial features in the metadata.

According to some example embodiments, the computer system 110 may include the memory 620, the communication module 610, and the processor 630 configured to connect to each of the memory 620 and the communication module 610 and to execute at least one instruction stored in the memory 620.

According to some example embodiments, the processor 630 may be configured to detect audio files that are generated for a plurality of objects at a venue, respectively, and metadata including spatial features at the venue that are set for the objects, respectively, and transmit the audio files and the metadata for a user through the communication module 610.

According to some example embodiments, the communication module 610 may be configured to support a format including the video track 310 for video content, the plain audio track 320 for audio content completed using a plurality of audio signals, and the immersive audio track 330 for the audio files and the metadata.

According to some example embodiments, the metadata may include at least one of position information about each of the objects, group information representing a position combination of at least two objects among the objects, and environment information about the venue.

According to some example embodiments, the object may include at least one of a musical instrument, an instrument player, a vocalist, a talker, a speaker, and a background.

According to some example embodiments, the immersive audio track 330 may include a plurality of audio channels for the audio files and a single meta-channel for the metadata.

According to some example embodiments, the immersive audio track 330 may include a PCM audio signal and may be encoded by an audio codec.

According to some example embodiments, the metadata may be transmitted through a single channel of the PCM audio signal, synchronized with the audio files, and transmitted according to a transmission period that is determined based on a frame size of the audio codec.

According to some example embodiments, a plurality of sets may be written in a single frame, and when the metadata is encoded using an AAC standard, at least one set among the plurality of sets may be inserted into a DSE, and when a start flag or an end flag of the metadata is not verified, metadata of a previous frame may be inserted.

According to some example embodiments, the processor 630 may be configured to detect the audio files and the metadata by receiving the audio files and the metadata from an electronic device based on a first communication protocol, through the communication module 610, and to transmit the audio files and the metadata to the electronic device 150 of the user based on a second communication protocol, through the communication module 610.

According to some example embodiments, the first communication protocol may support a transmission scheme in an uncompressed format or a compressed format.

According to some example embodiments, the second communication protocol may support a transmission scheme in a compressed format.

According to some example embodiments, the electronic device 150 may be configured to realize a being-there at the venue by receiving the audio files and the metadata through the immersive audio track 330, by decoding the audio files and the metadata using a decoder, and by rendering the audio files based on the spatial features in the metadata.

The apparatuses described herein may be implemented using hardware components, and/or a combination of hardware components and software components. For example, a processing device and various components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. Further, different processing configurations are possible, such as parallel processors.

The software may include a computer program, a piece of code, an instruction, or at least one combination thereof, for independently or collectively instructing or configuring the processing device to operate as desired. Software and/or data may be embodied permanently or temporarily in any type of machine, component, physical equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. Here, the media may continuously store programs executable by a computer or may temporally store the same for execution or download. The media may be various record devices or storage devices in a form in which one or a plurality of hardware components is coupled and may be distributed in a network. Examples of the media include magnetic media such as hard disks, floppy disks, and magnetic tape, optical media such as CD ROM disks and DVD, magneto-optical media such as floptical disks, and hardware devices that are specially configured to store program instructions, such as read-only memory (ROM), random access memory (RAM), flash memory, and the like. Examples of other media may include recording media and storage media managed by an app store that distributes applications or a venue, a server, and the like that supplies and distributes other various types of software.

The example embodiments and the terms used herein are not construed to limit the technique described herein to specific example embodiments and may be understood to include various modifications, equivalents, and/or substitutions. Like reference numerals refer to like elements throughout. As used herein, the singular forms "a," "an," and "the," are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe various components and the components should not be limited by the terms. The terms are simply used to distinguish one component from another component. When a component (e.g., a first component) is described to be "(functionally or communicatively) connected to" or "accessed to" another component (e.g., a second component), the component may be directly connected to the other component or may be connected through still another component (e.g., a third component).

The term "module" used herein may include a unit configured as hardware, or a combination of hardware and software (e.g., firmware), and may be interchangeably used with, for example, the terms "logic," "logic block," "part," "circuit," etc. The module may be an integrally configured part, a minimum unit that performs at least one function, or a portion thereof. For example, the module may be configured as an application-specific integrated circuit (ASIC).

According to some example embodiments, each component (e.g., module or program) of the aforementioned components may include a singular entity or a plurality of entities. According to some example embodiments, at least one component among the aforementioned components or operations may be omitted, or at least one another component or operation may be added. In some example embodiments, the plurality of components (e.g., module or program) may be integrated into a single component. In this case, the integrated component may perform the same or similar functionality as being performed by a corresponding component among a plurality of components before integrating at least one function of each component of the plurality of components. According to some example embodiments, operations performed by a module, a program, or another component may be performed in parallel, repeatedly, or heuristically, or at least one of the operations may be performed in different order or omitted. In some example embodiments, at least one another operation may be added.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A method by a computer system, the method comprising:
- detecting audio files and metadata, the audio files being generated for a plurality of objects at a venue, respectively, the metadata including spatial features at the venue that are set for the objects, respectively; and
- transmitting the audio files and the metadata for a user, wherein
- the computer system is configured to support a format including a video track for video content, a plain audio track for audio content completed using a plurality of audio signals, and an immersive audio track for the audio files and the metadata,
- the detecting comprises receiving the audio files and the metadata from a first electronic device based on a first communication protocol, through the immersive audio track of the format, and
- the transmitting comprises transmitting the audio files and the metadata to a second electronic device of the user based on a second communication protocol, through the immersive audio track of the format.

2. The method of claim 1, wherein the metadata includes at least one of position information about each of the objects, group information representing a position combination of at least two objects among the objects, and environment information about the venue.

3. The method of claim 1, wherein each of the objects includes one of a musical instrument, an instrument player, a vocalist, a talker, a speaker, and a background.

4. The method of claim 1, wherein the immersive audio track includes a plurality of audio channels for the audio files and a single meta-channel for the metadata.

5. The method of claim 1, wherein the second communication protocol supports a transmission scheme in a compressed format.

6. The method of claim 1, wherein the first communication protocol supports a transmission scheme in an uncompressed format or a compressed format.

7. The method of claim 1, further comprising:
- causing, by the computer system, the second electronic device to realize a being-there at the venue by receiving the audio files and the metadata through the immersive audio track, by decoding the audio files and the metadata, and by rendering the audio files based on the spatial features in the metadata.

8. A method by a computer system, the method comprising:
- detecting audio files and metadata, the audio files being generated for a plurality of objects at a venue, respectively, the metadata including spatial features at the venue that are set for the objects, respectively; and
- transmitting the audio files and the metadata for a user,
- wherein the computer system is configured to support a format including a video track for video content, a plain audio track for audio content completed using a plurality of audio signals, and an immersive audio track for the audio files and the metadata,
- wherein the immersive audio track includes a plurality of audio channels for the audio files and a single meta-channel for the metadata, and
- wherein the method further comprises,
  - encoding the immersive audio track by an audio codec, the immersive audio track including a pulse code modulation (PCM) audio signal,
  - transmitting the metadata, which has been transmitted through a single channel of the PCM audio signal and synchronized with the audio files, according to a transmission period that is determined based on a frame size of the audio codec, the metadata included as a plurality of sets in a single frame,
  - encoding the metadata using an advanced audio coding (AAC) standard,
  - inserting at least one set among the plurality of sets into a data stream element (DSE), and
  - inserting metadata of a previous frame in response to a start flag or an end flag of the metadata being not verified.

9. A non-transitory computer-readable record medium storing a program, which when executed by at least one processor included in a computer system, to cause the computer system to perform the method of claim 1.

10. A computer system comprising:
- a memory; and
- a processor configured to connect to each of the memory and execute at least one instruction stored in the memory to cause the computer system to,
  - detect audio files and metadata, the audio files being generated for a plurality of objects at a venue, respectively, the metadata including spatial features at the venue that are set for the objects, respectively, and
  - transmit the audio files and the metadata for a user,
- wherein the processor is further configured to cause the computer system to,
  - support a format including a video track for video content, a plain audio track for audio content completed using a plurality of audio signals, and an immersive audio track for the audio files and the metadata,
  - detect the audio files and the metadata by receiving the audio files and the metadata from a first electronic device based on a first communication protocol, and
  - transmit the audio files and the metadata to a second electronic device of the user based on a second communication protocol.

11. The computer system of claim 10, wherein the metadata includes at least one of position information about each of the objects, group information representing a position combination of at least two objects among the objects, and environment information about the venue.

12. The computer system of claim 10, wherein each of the objects includes at least one of a musical instrument, an instrument player, a vocalist, a talker, a speaker, and a background.

13. The computer system of claim 10, wherein the immersive audio track includes a plurality of audio channels for the audio files and a single meta-channel for the metadata.

14. The computer system of claim 13, wherein the processor is further configured to cause the computer system to, encode the immersive audio track by an audio codec, the immersive audio track including a pulse code modulation (PCM) audio signal, transmit the metadata, which has been transmitted through a single channel of the PCM audio signal and synchronized with the audio files, according to a transmission period that is determined based on a frame size of the audio codec, the metadata included as a plurality of sets in a single frame, encode the metadata using an advanced audio coding (AAC) standard, insert at least one set among the plurality of sets into a data stream element (DSE), and insert metadata of a previous frame in response to a start flag or an end flag of the metadata being not verified.

15. The computer system of claim 10, wherein the first communication protocol supports a first transmission scheme in an uncompressed format or a compressed format, and the second communication protocol supports a second transmission scheme in a compressed format.

16. The computer system of claim 10, wherein the processor is further configured to cause the computer system to cause the second electronic device to realize a being-there at the venue by receiving the audio files and the metadata through the immersive audio track, by decoding the audio files and the metadata, and by rendering the audio files based on the spatial features in the metadata. a.

* * * * *